United States Patent
Ogata

(10) Patent No.: US 8,282,385 B2
(45) Date of Patent: Oct. 9, 2012

(54) DIE FOR MOLDING CERAMIC HONEYCOMB STRUCTURE

(75) Inventor: Tomohisa Ogata, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/934,025

(22) PCT Filed: Mar. 18, 2009

(86) PCT No.: PCT/JP2009/055355
§ 371 (c)(1),
(2), (4) Date: Sep. 22, 2010

(87) PCT Pub. No.: WO2009/119422
PCT Pub. Date: Oct. 1, 2009

(65) Prior Publication Data
US 2011/0027406 A1    Feb. 3, 2011

(30) Foreign Application Priority Data
Mar. 28, 2008 (JP) .................. 2008-087514

(51) Int. Cl.
*B29C 47/12* (2006.01)
*B28B 3/26* (2006.01)
*B29C 47/30* (2006.01)

(52) U.S. Cl. ... 425/461; 425/467; 425/380; 264/177.12; 264/630

(58) Field of Classification Search .................. 425/461, 425/462, 467, 464, 380; 264/629, 630, 177.12
See application file for complete search history.

(56) References Cited

U.S. PATENT DOCUMENTS

| | | | | |
|---|---|---|---|---|
| 3,790,654 A | * | 2/1974 | Bagley | 264/177.11 |
| 3,905,743 A | * | 9/1975 | Bagley | 425/464 |
| 4,321,025 A | * | 3/1982 | Cunningham | 425/131.1 |
| 4,373,895 A | * | 2/1983 | Yamamoto et al. | 425/461 |
| 4,486,934 A | * | 12/1984 | Reed | 76/107.1 |
| 4,731,010 A | * | 3/1988 | Cunningham | 425/461 |
| 4,846,657 A | * | 7/1989 | Chao | 425/190 |
| 5,206,166 A | * | 4/1993 | Payne et al. | 435/252.3 |
| 5,308,568 A | * | 5/1994 | Lipp | 264/177.12 |
| 5,702,659 A | * | 12/1997 | Kragle et al. | 264/177.11 |
| 5,807,590 A | * | 9/1998 | Ishikawa et al. | 425/190 |
| 6,080,348 A | * | 6/2000 | Shalkey | 264/177.12 |
| 6,432,249 B1 | * | 8/2002 | Cunningham et al. | 156/257 |
| 6,558,151 B1 | * | 5/2003 | Kragle | 425/463 |
| 6,570,119 B2 | * | 5/2003 | Marcher | 219/69.17 |
| 6,723,262 B2 | * | 4/2004 | Hidaka et al. | 264/40.5 |

(Continued)

FOREIGN PATENT DOCUMENTS
JP    10-315213 A    12/1998
(Continued)

*Primary Examiner* — Joseph Del Sole
*Assistant Examiner* — Nahida Sultana
(74) *Attorney, Agent, or Firm* — Sughrue Mion, PLLC

(57) ABSTRACT

A die comprising molding grooves arranged in a lattice pattern and moldable-material-supplying holes communicating with the molding grooves for molding a ceramic honeycomb structure, the molding grooves having width of 0.05-0.5 mm, the moldable-material-supplying holes being arranged in every intersecting portions of the molding grooves, or in every other intersecting portions of the molding grooves in a checkerboard pattern, and an average distance between the centers of the intersecting portions of the molding grooves, at which the moldable-material-supplying holes are arranged, and the center axes of the moldable-material-supplying holes being 10-100 μm.

4 Claims, 7 Drawing Sheets

U.S. PATENT DOCUMENTS

| | | | |
|---|---|---|---|
| 6,969,119 B1 * | 11/2005 | Jennings | 297/423.41 |
| 2001/0045366 A1 * | 11/2001 | Iwata et al. | 205/665 |
| 2003/0042229 A1 * | 3/2003 | Marcher | 219/69.17 |
| 2006/0103058 A1 | 5/2006 | Wada et al. | |
| 2008/0017520 A1 | 1/2008 | Koishikura et al. | |
| 2008/0225302 A1 * | 9/2008 | Nagatoshi et al. | 356/601 |
| 2009/0120950 A1 * | 5/2009 | Titas et al. | 221/45 |
| 2009/0139193 A1 * | 6/2009 | Garcia et al. | 55/523 |
| 2010/0005821 A1 * | 1/2010 | McCahill | 62/238.6 |
| 2010/0009381 A1 * | 1/2010 | Agnew et al. | 435/7.1 |
| 2011/0206896 A1 * | 8/2011 | Humphrey et al. | 428/117 |
| 2011/0303398 A1 * | 12/2011 | Scott et al. | 165/135 |

FOREIGN PATENT DOCUMENTS

| | | |
|---|---|---|
| JP | 2001-150422 A | 6/2001 |
| JP | 2002-079510 A | 3/2002 |
| JP | 2006-088556 A | 4/2006 |
| JP | 2006-142579 A | 6/2006 |
| WO | 2006/098433 A1 | 9/2006 |

* cited by examiner

DIE FOR MOLDING CERAMIC HONEYCOMB STRUCTURE

FIELD OF THE INVENTION

The present invention relates to a die for molding a ceramic honeycomb structure, which comprises molding grooves arranged in a lattice pattern, and moldable-material-supplying holes communicating with the molding grooves and arranged in every or every other intersecting portions of the molding grooves.

BACKGROUND OF THE INVENTION

A ceramic honeycomb structure is produced, for instance, by extruding a cordierite-based ceramic, moldable material through a die for molding a ceramic honeycomb structure (hereinafter referred to as "molding die" below) in a direction from moldable-material-supplying holes to molding grooves, to form a ceramic honeycomb molding, and drying and sintering it. As shown in FIGS. 4(a) and 4(b), a molding die 31 comprises molding grooves 12 arranged in a lattice pattern, and moldable-material-supplying holes 13 communicating with the molding grooves.

As shown in FIGS. 5(a), 5(b) and 5(c), supply holes 13 are arranged in the molding die 31 such that they overlap the intersecting portions 33 of molding grooves. A ceramic, moldable material introduced into the molding die 31 through the supply holes 13 is formed to a honeycomb shape by the molding grooves 12. The supply holes 13 are communicating with every intersecting portions 33 of the molding grooves 12 arranged in a lattice pattern, or with every other intersecting portions 33 in a checkerboard pattern [see in FIGS. 5(a), 5(b) and 5(c)].

In order that the ceramic honeycomb structures for cleaning exhaust gases from automobiles have larger opening areas of exhaust gas paths, and that their temperatures are more quickly elevated to activation temperatures when carrying catalysts, their cell walls are as thin as 0.05-0.5 mm. Accordingly, molding grooves 12 in the molding die 31 have smaller width 12w [see FIG. 5(c)]. On the other hand, to prevent the deformation and bending of moldings, the depth 12d of the molding grooves 12 should be 10 times or more the width 12w.

As the molding grooves 12 have smaller width 12w and larger depth 12d, a moldable material (shown by the arrows of thick dotted lines) supplied from the holes 13 receives larger resistance while passing through the molding grooves 12. Accordingly, the molding die is bent (exaggerated by phantom lines), and large stress is applied to overlapping portions 14b of the moldable-material-supplying holes 13 and the molding grooves 12.

JP 2006-142579 A discloses a molding die comprising pluralities of cell blocks for defining molding grooves, their pitches expanding stepwise from a center portion to a peripheral portion. JP 2006-142579 A describes that the use of this molding die suppresses cell pitch unevenness between the center portion and the peripheral portion, which is caused by deformation due to uneven heating during drying, providing ceramic honeycomb structures with uniform cell pitches.

JP 2006-88556 A discloses a die comprising molding grooves arranged in a lattice pattern, and moldable-material-supplying holes staggeringly arranged in intersecting portions of the molding grooves for communication therewith for molding a ceramic honeycomb structure, which meets the conditions of A/L=1-5, and A/D=0.05-0.3, wherein in FIG. 5(c), A represents the shortest distance between a side surface 13a of a moldable-material-supplying hole 13 communicating with one groove 12 and a side surface 14a (side surface of cell block 14) of another molding groove 12 adjacent to the above molding groove 12, L represents the longitudinal length of an overlapping portion 14b of the molding groove 12 and the moldable-material-supplying hole 13, and D represents length obtained by subtracting L from the depth of the molding groove. JP 2006-88556 A describes that this molding die has such high strength that it is not broken during die machining and the extrusion of moldings, providing ceramic honeycomb structures with improved sintering strength.

However, the molding dies described in JP 2006-142579 A and JP 2006-88556 A cannot sufficiently reduce stress applied to the moldable-material-supplying holes 13 and their overlapping portions 14b with the molding grooves 12 during extrusion. Particularly when dies having narrower molding grooves are used to mold ceramic honeycomb structures having thinner cell walls, stress is likely concentrated in the overlapping portions 14b, resulting in cracking between adjacent moldable-material-supplying holes 13, 13. Accordingly, dies suitable for molding ceramic honeycomb structures having thin cell walls are desired.

OBJECT OF THE INVENTION

Accordingly, an object of the present invention is to provide a molding die receiving reduced stress in overlapping portions of moldable-material-supplying holes and molding grooves during extrusion, so that cracking unlikely occurs in the overlapping portions even when the molding grooves are narrow, and that cracking if any does not easily propagate, to ensure its use for a long period of time.

DISCLOSURE OF THE INVENTION

As a result of intensive research in view of the above object, the inventor has found that with the centers of the intersecting portions of molding grooves deviating from the center axes of the moldable-material-supplying holes arranged in the intersecting portions, stress applied to overlapping portions of the moldable-material-supplying holes and the molding grooves can be reduced during extrusion. The present invention has been completed based on such finding.

Thus, the die of the present invention for molding a ceramic honeycomb structure comprises molding grooves arranged in a lattice pattern, and moldable-material-supplying holes communicating with the molding grooves, the molding grooves having width of 0.05-0.5 mm, the moldable-material-supplying holes being arranged in every intersecting portions of the molding grooves, or in every other intersecting portions of the molding grooves in a checkerboard pattern, and an average distance between the centers of the intersecting portions of the molding grooves, at which the moldable-material-supplying holes are arranged, and the center axes of the moldable-material-supplying holes being 10-100 μm.

The center axes of moldable-material-supplying holes are preferably arranged along each molding groove on both sides of its centerline.

The center axes of moldable-material-supplying holes are preferably arranged along each molding groove on the same side of its centerline.

The center axes of moldable-material-supplying holes are preferably arranged staggeringly (alternately on both sides) along a centerline of each molding groove.

DESCRIPTION OF THE BEST MODE OF THE INVENTION

In a die comprising molding grooves each having a width of 0.05-0.5 mm for molding a ceramic honeycomb structure, moldable-material-supplying holes are arranged such that their center axes are not aligned with the centers of the intersecting portions of molding grooves in which the moldable-material-supplying holes are arranged, thereby preventing adjacent moldable-material-supplying holes from having a constant interval. An average distance between the centers of the intersecting portions of molding grooves and the center axes of the moldable-material-supplying holes is 10-100 μm. With the moldable-material-supplying holes thus arranged, dispersed stress is applied to overlapping portions of the moldable-material-supplying holes and the molding grooves during extrusion, so that cracking is less likely between adjacent moldable-material-supplying holes. Even when cracking occurs, it does not easily propagate. As a result, the molding die can be used for a long period of time. The average distance between the centers of the intersecting portions of molding grooves and the center axes of the moldable-material-supplying holes is measured on 10 arbitrarily selected moldable-material-supplying holes.

When the above average distance is less than 10 μm, the moldable-material-supplying holes have substantially constant intervals, so that high stress is applied to overlapping portions of the moldable-material-supplying holes and the molding grooves during extrusion, making it likely that cracking occurs between adjacent moldable-material-supplying holes. On the other hand, when the above average distance is more than 100 μm, a ceramic, moldable material does not easily spread to the molding grooves uniformly during extrusion, resulting in the likelihood of forming bent or deformed moldings. The above average distance is preferably 20-90 μm.

To arrange the moldable-material-supplying holes such that the centers of the intersecting portions of molding grooves are not aligned with the center axes of moldable-material-supplying holes, the positions of the molding grooves and/or the moldable-material-supplying holes may be adjusted by conventional die-producing technologies. The center axes of moldable-material-supplying holes may be dislocated from the centers of the intersecting portions of molding grooves along the longitudinal and/or transverse directions of the molding grooves.

Figure 6A:
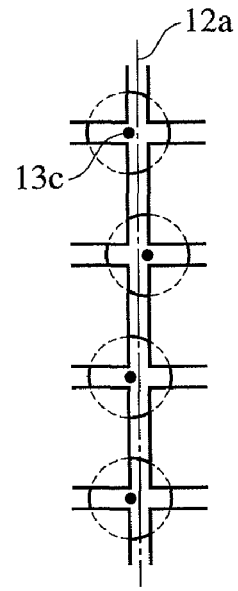
FIG. 6(a) is a schematic view showing an example in which the center axes of moldable-material-supplying holes are arranged on both sides of a centerline of a molding groove.

The center axes of the moldable-material-supplying holes are preferably arranged along one molding groove on both sides of its centerline as shown in FIG. 6(a). With such arrangement, stress applied to overlapping portions of the moldable-material-supplying holes and the molding grooves is more dispersed, thereby suppressing cracking from occurring between the adjacent moldable-material-supplying holes. It is particularly preferable that as shown in FIG. 6(d), the center axes of the moldable-material-supplying holes are arranged staggeringly along a centerline of each molding groove.

Figure 6B:
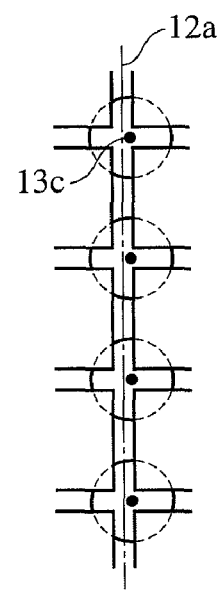
FIG. 6(b) is a schematic view showing an example in which the center axes of moldable-material-supplying holes are arranged on the same side of a centerline of a molding groove.
Figure 6C:
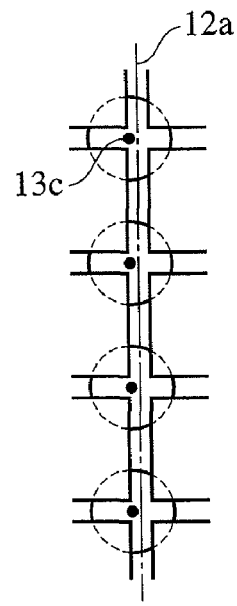
FIG. 6(c) is a schematic view showing another example in which the center axes of moldable-material-supplying holes are arranged on the same side of a centerline of a molding groove.
Figure 6D:
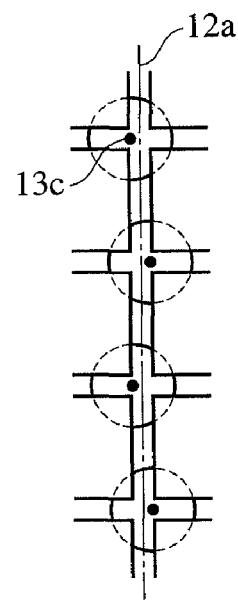
FIG. 6(d) is a schematic view showing an example in which the center axes of moldable-material-supplying holes are arranged staggeringly along a centerline of a molding groove.

When the center axes of moldable-material-supplying holes are arranged along one molding groove on the same side of its centerline as shown in FIGS. 6(b) and 6(c), too, dispersed stress is applied to overlapping portions of the moldable-material-supplying holes and the molding grooves, suppressing cracking between adjacent moldable-material-supplying holes.

The embodiments of the present invention will be explained below.

Embodiment 1

Embodiment 1 is directed to a die 11 having a post-sintering diameter of 120 mm for molding a cordierite-based ceramic honeycomb structure. This molding die 11 can be produced, for instance, by pre-hardening a die material having a composition comprising 0.10-0.25% by mass of C, 1% by mass or less of Si, 2% by mass or less of Mn, 1-2.5% by mass of Cr, 1% by mass or less as (Mo+½W) of Mo and/or W, 0.03-0.15% by mass of V, 0.1-1% by mass of Cu, 0.05% by mass or less of S, and 2% by mass or less of Ni, the balance being Fe and inevitable impurities to HRC of 29-33, and then machining the die material to form moldable-material-supplying holes 13 and molding grooves 12. Known die materials may be used, and for instance, alloyed tool steel such as JIS SK1313D61, martensitic stainless steel such as JIS SUS420J2 are preferable.

Figure 1A:
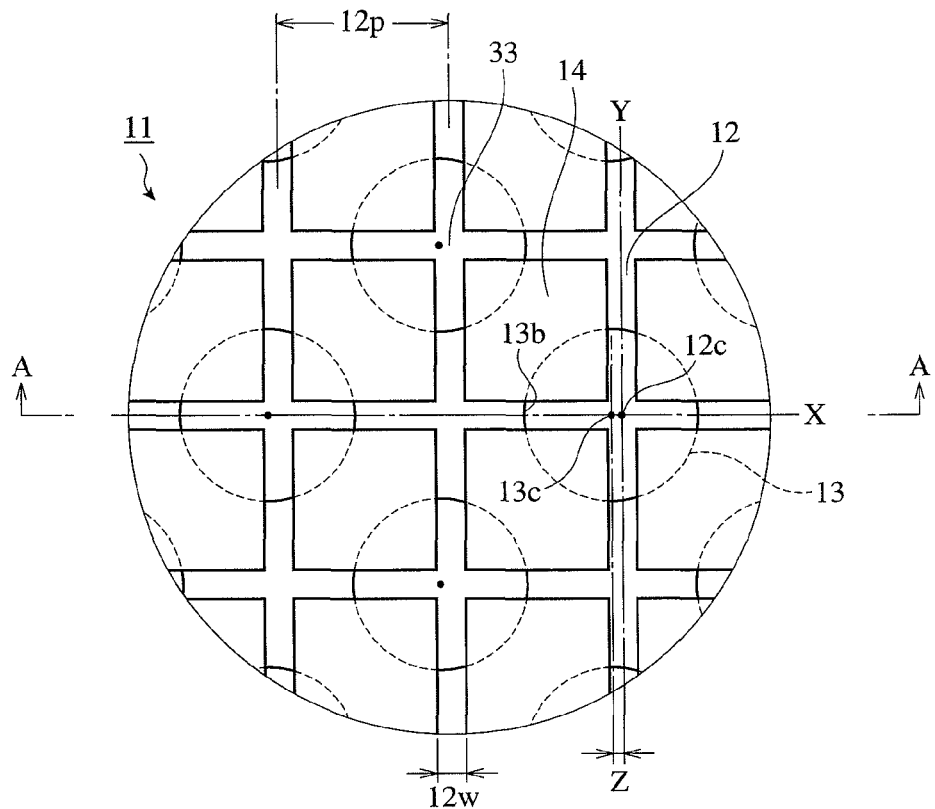
FIG. 1(a) is a partial plan view showing the molding die of Embodiment 1 and Example 1.
Figure 1B:
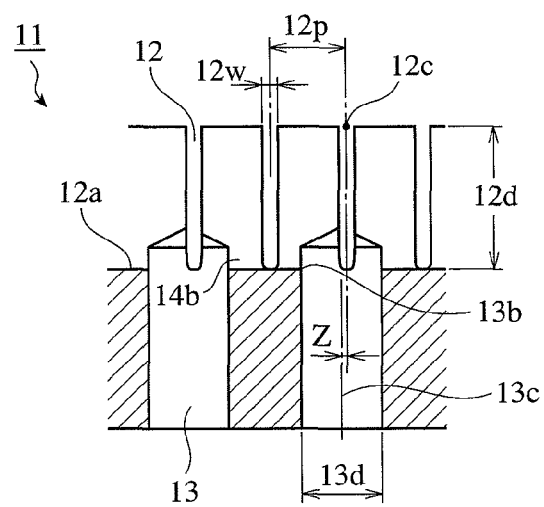
FIG. 1(b) is a cross-sectional view taken along the line A-A in FIG. 1(a).

The molding grooves 12 consist of a large number of longitudinal grooves arranged with a width 12w of 0.26 mm and a pitch 12p of 1.56 mm, and a large number of transverse grooves arranged with the same width and pitch perpendicularly to the longitudinal grooves, as shown in FIGS. 1(a), 1(b)

and 1(c). The moldable-material-supplying holes 13 each having a diameter 13d of 1.2 mm and a depth of 20 mm are arranged in the intersecting portions 33 of the molding grooves 12 in a checkerboard pattern. The center axis 13c of each moldable-material-supplying hole 13 is arranged along a lateral centerline X of each molding groove, such that it is separate from a center 12c of each intersection 33 of the molding grooves 12 by distance Z on the same side along the centerline Y of each vertical molding groove. The separation distances Z of the moldable-material-supplying holes 13 are not constant, within a range of 10 µm to 100 µm when averaged on 10 points. In each molding groove 12, a groove bottom is connected to side surfaces via continuously curved surfaces.

Using an image measurement system "Quick Vision" available from Mitutoyo Corporation, the distance Z can be determined by taking an image of the molding die 11 from the side of the molding grooves 12, determining the intersection centers 12c of the molding grooves 12 and the center axes 13c of the moldable-material-supplying holes 13, and averaging distances therebetween on 10 points. The intersection centers 12c of the molding grooves 12 are determined by the image detection of four corners of the intersecting portions of the molding grooves 12, and the center axes 13c of the moldable-material-supplying holes 13 are determined by the image detection of part (four portions) of the outlines of the moldable-material-supplying holes 13 appearing in the molding grooves 12.

Figure 2A:
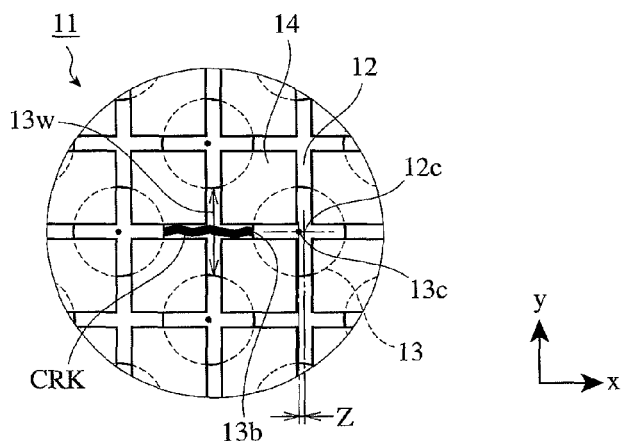
FIG. 2(a) is a schematic plan view showing the propagation of cracks when a moldable material is extruded from the molding die of Embodiment 1.

FIG. 2(a) schematically shows the propagation of cracking (CRK) between adjacent moldable-material-supplying holes 13, 13, when a moldable material is extruded from the moldable-material-supplying holes 13 to the molding grooves 12 in the molding die 11 of Embodiment 1. Because the center axes 13c of the moldable-material-supplying holes 13 are deviated from the centers 12c of the intersecting portions 33 of the molding grooves 12 in the same direction along the X-axis centerlines of the molding grooves in the molding die 11, adjacent moldable-material-supplying holes 13, 13 in the molding grooves have long intervals 13w in a Y-axis direction, reducing stress applied to intersecting portions 13b of the bottoms 12a of the molding grooves 12 and the moldable-material-supplying holes 13. Even when repeated extrusion causes metal fatigue in overlapping portions 14b, resulting in cracking (CRK) between the moldable-material-supplying holes 13, 13, the cracking (CRK) does not easily propagate, making it possible to use the die for a long period of time.

Figure 2B:
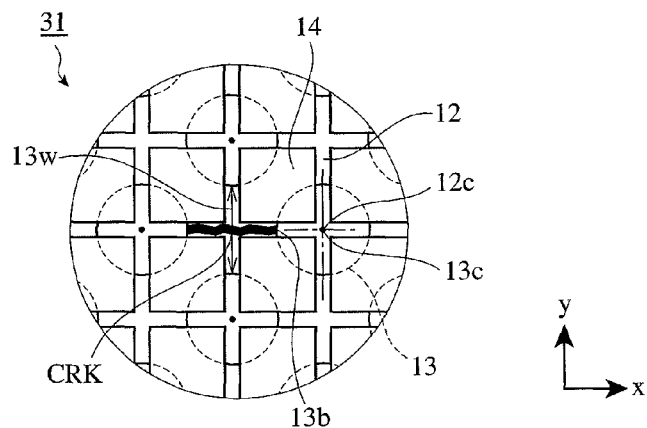
FIG. 2(b) is a schematic plan view showing the propagation of cracks when a moldable material is extruded from a conventional molding die.
Figure 5A:
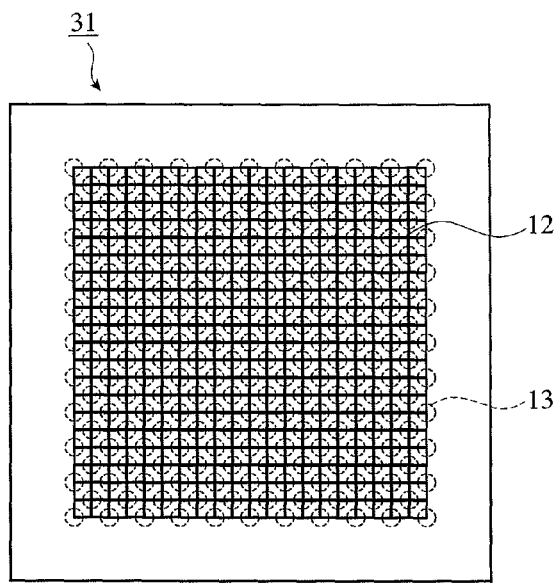
FIG. 5(a) is a front view showing one example of positional relations between molding grooves and moldable-material-supplying holes in a conventional molding die.
Figure 5B:
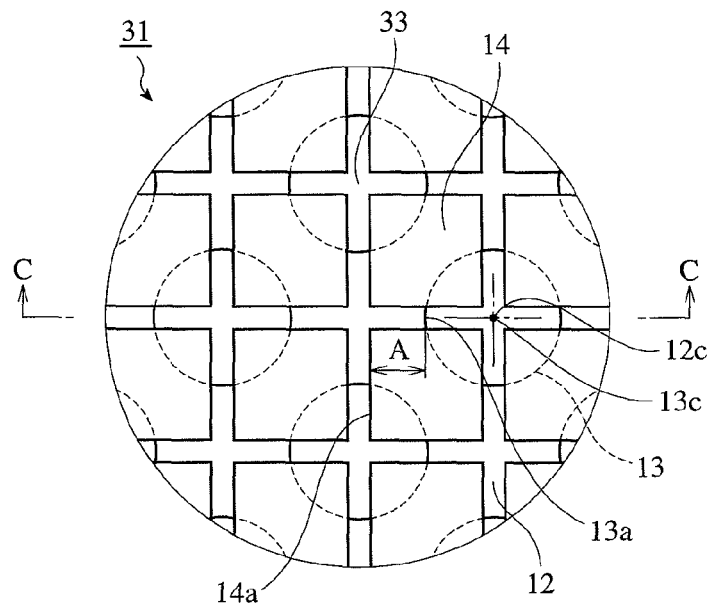
FIG. 5(b) is an enlarged plan view showing part of FIG. 5(a).
Figure 5C:
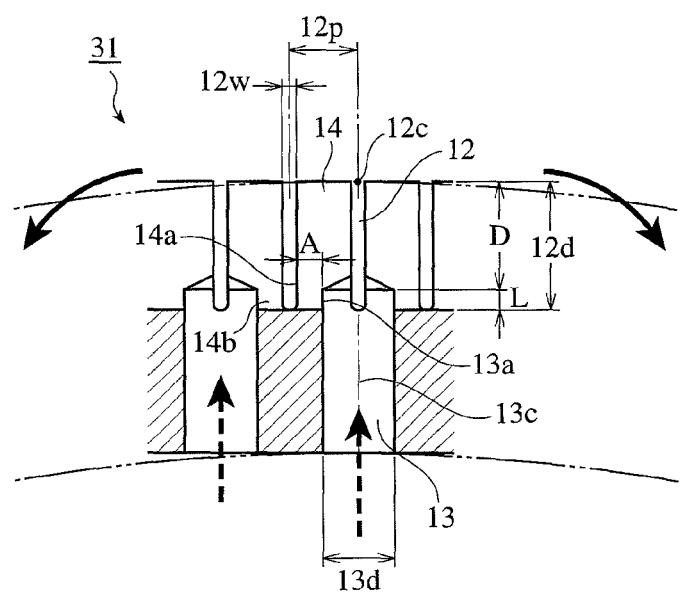
FIG. 5(c) is a cross-sectional view taken along the line C-C in FIG. 5(b).

On the other hand, FIG. 2(b) schematically shows the propagation of cracking (CRK) between adjacent moldable-material-supplying holes 13, 13, when a moldable material is similarly extruded from a conventional molding die 31 (see FIG. 5). Because the centers 12c of the intersecting portions 33 of the molding grooves 12 are aligned with the center axes 13c of the moldable-material-supplying holes 13 in the moldings die 31, resulting in constant intervals 13w between the adjacent moldable-material-supplying holes 13, 13, stress concentrated in the intersecting portions 13b of the bottoms 12a of the molding grooves 12 and the moldable-material-supplying holes 13 is not dispersed. Repeated extrusion causes metal fatigue in the overlapping portions of 14b, resulting in more cracking (CRK) between the moldable-material-supplying holes 13, 13 than in Embodiment 1, if any. As a result, cracks easily propagate, making it difficult to use the die for a long period of time.

Embodiment 2

Embodiment 2 is directed to a molding die 21 having a post-sintering diameter of 100 mm for forming a cordierite-based ceramic honeycomb structure. This molding die 21 comprises moldable-material-supplying holes 13 arranged at intersecting portions 33 of molding grooves 12 in a lattice pattern as shown in FIG. 3(a), and can be produced by the die material shown in Embodiment 1.

The molding grooves 12 consist of a large number of longitudinal grooves arranged with a width 12w of 0.22 mm and a pitch 12p of 1.25 mm, and a large number of transverse grooves arranged with the same width and pitch perpendicularly to the longitudinal grooves. The moldable-material-supplying holes 13 each having a diameter 13d of 1.0 mm and a depth of 22 mm are arranged in the intersecting portions 33 of the molding grooves 12. The molding grooves 12 are formed after the moldable-material-supplying holes 13 are formed. The center axis 13c of each moldable-material-supplying hole 13 is arranged along a centerline of each X-axis molding groove, such that it is separate from a center 12c of each intersection 33 of the molding grooves 12 by distance Z staggeringly along the centerline of each Y-axis molding groove. The separation distances Z of the moldable-material-supplying holes 13 are not constant, within a range of 10 µm to 100 µm when averaged on 10 points. In each molding groove 12, a groove bottom is connected to side surfaces via continuously curved surfaces.

Figure 3A:
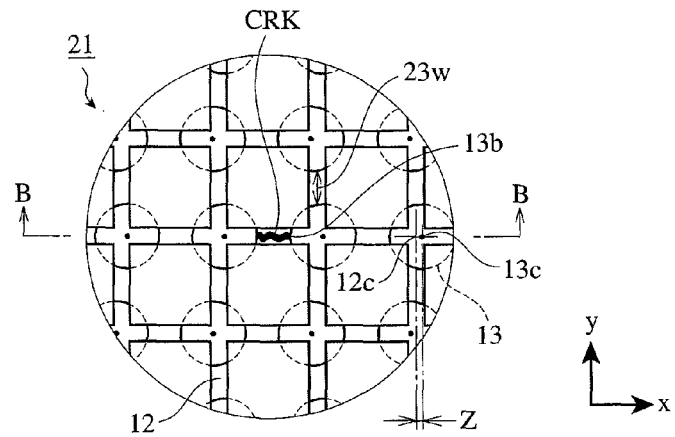
FIG. 3(a) is a partial plan view showing the molding die of Embodiment 2.
Figure 3B:
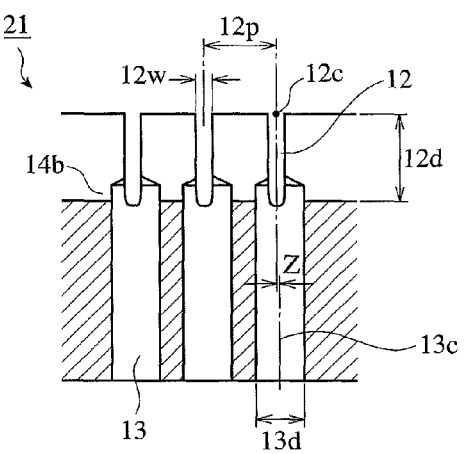
FIG. 3(b) is a cross-sectional view taken along the line B-B in FIG. 3(a).
Figure 3C:
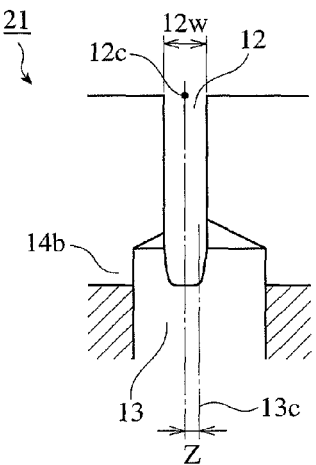
FIG. 3(c) is an enlarged, partial cross-sectional view showing an overlapping portion of the moldable-material-supplying hole of FIG. 3(b) and a molding groove.
Figure 4A:
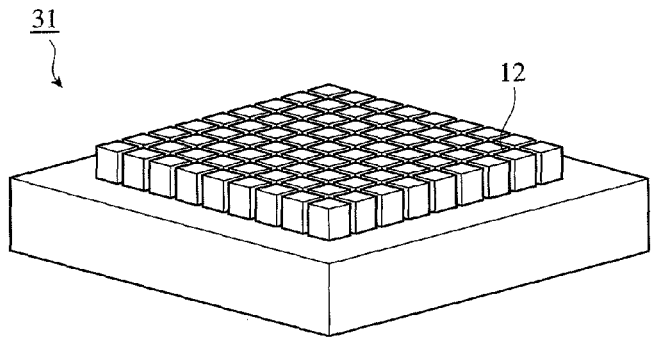
FIG. 4(a) is a perspective view showing one example of the molding dies from the side of molding grooves.
Figure 4B:
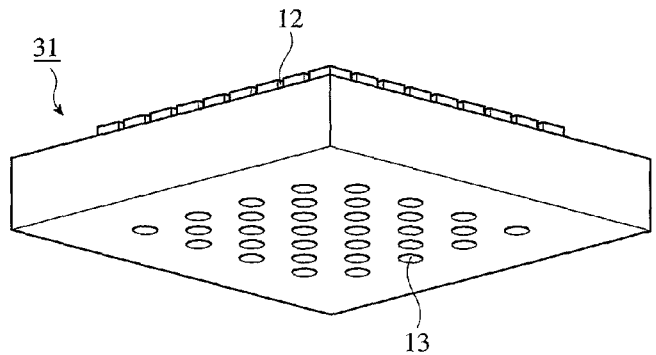
FIG. 4(b) is a perspective view showing one example of the molding dies from the side of moldable-material-supplying holes.

FIG. 3(a) schematically shows the propagation of cracking (CRK) between adjacent moldable-material-supplying holes 13, 13, when a moldable material is extruded from the moldable-material-supplying holes 13 to the molding grooves 12 in the molding die 21 of Embodiment 2. Because the center axes 13c of the moldable-material-supplying holes 13 are deviated from the centers 12c of the intersecting portions 33 of the molding grooves 12 staggeringly along the centerlines of the X-axis molding grooves in the molding die 21, adjacent moldable-material-supplying holes 13, 13 in the molding grooves have long intervals 23w in a Y-axis direction, reducing stress applied to intersecting portions 13b of the bottoms 12a of the molding grooves 12 and the moldable-material-supplying holes 13. Even when repeated extrusion causes metal fatigue in overlapping portions 14b, resulting in cracking (CRK) between the moldable-material-supplying holes 13, 13, the cracking (CRK) does not easily propagate, making it possible to use the die for a long period of time.

The present invention will be explained in more detail referring to Examples below without intention of restricting it thereto.

Example 1

A test die material block was produced by pre-hardening a die material having a composition comprising 0.20% by mass of C, 0.44% by mass of Si, 1.95% by mass of Mn, 1.25% by mass of Cr, 0.50% by mass of Mo, 0.04% by mass of V, 0.30% by mass of Cu, and 0.015% by mass of S, the balance being Fe and inevitable impurities, to HRC of 31.3 before forming moldable-material-supplying holes 13 and molding grooves 12.

Figure 1C:
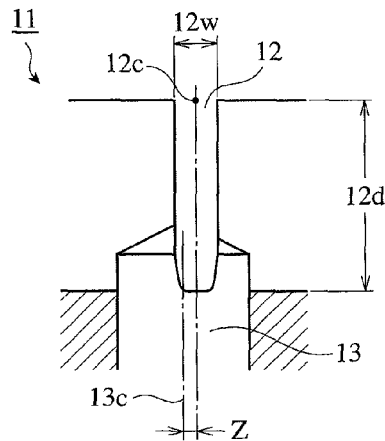
FIG. 1(c) is an enlarged, partial cross-sectional view showing an overlapping portion of the moldable-material-supplying hole of FIG. 1(b) and a molding groove.

This die material block was mounted to a machining center (not shown) to form moldable-material-supplying holes 13 each having a diameter 13d of 1.2 mm and depth of 20 mm with a pitch of 3.12 mm by a cemented carbide drill staggeringly as shown in FIGS. 1(a), 1(b) and 1(c). In this case, moldable-material-supplying holes 13 were formed such that they were arranged on the same side of the centerlines of molding grooves within a range of 10 µm to 100 µm from the centers of the intersecting portions of molding grooves to be formed later. With the die material having the moldable-material-supplying holes 13 mounted to a groove-forming machine, a large number of longitudinal grooves each having a depth 12d of 4 mm and a pitch 12p of 1.56 mm were formed by an electrodeposited diamond grinder having a width of 0.26 mm, and then transverse grooves were formed like the longitudinal grooves, to produce a test die 11A.

In the molding die 11A, moldable-material-supplying holes 13 were arranged at intersecting portions 33 of the lattice-patterned grooves 12 in a staggering manner. The center axes 13c of the moldable-material-supplying holes 13 were arranged, such that they were separate from the centers 12c of the intersecting portions 33 of molding grooves 12 on the same side of the centerlines Y of the longitudinal molding grooves by distance Z along the centerlines X of transverse molding grooves. The distance Z was 105 µm or less, and its average was 11 µm when measured on 10 arbitrary points.

Examples 2-6

The molding dies 11A of Examples 2-6 were produced in the same manner as in Example 1, except for forming moldable-material-supplying holes 13 with their arrangement and the average distance Z relative to each centerline of grooves as shown in Table 1.

Comparative Example 1

The test die 31A of Comparative Example 1 was produced in the same manner as in Example 1, except for forming moldable-material-supplying holes 13 such that their center axes 13c were aligned at the centers 12c of intersecting portions 33 of the grooves 12.

Comparative Example 2

The test die 31B of Comparative Example 2 was produced in the same manner as in Example 1, except for forming moldable-material-supplying holes 13 with the average distance Z of 9 µM.

Comparative Example 3

The test die 31C of Comparative Example 3 was produced in the same manner as in Example 3, except for forming moldable-material-supplying holes 13 with the average distance Z of 110 µm.

Durability Test of Dies

Using each of the test dies 11A of Examples 1-6 and the test dies 31A, 31B, 31C of Comparative Examples 1-3, a cordierite-based ceramic, moldable material was repeatedly extruded for a durability test. The cordierite-based ceramic, moldable material was produced by mixing kaolin powder, talc powder, silica powder, alumina powder, etc. to prepare cordierite-forming material powder comprising 50% by mass of $SiO_2$, 35% by mass of $Al_2O_3$ and 13% by mass of MgO, sufficiently dry-mixing 100 parts by mass of the cordierite-forming material with 7 parts by mass in total of methylcellulose and hydroxypropyl methylcellulose as a molding aid and a proper amount of graphite as a pore-forming material, and then sufficiently blending the resultant mixture with a predetermined amount of water.

The durability of each die was evaluated by counting the number of molding operations until the molding die became unusable because of cracking between moldable-material-supplying holes as a result of repeated extrusion, and by observing by the naked eye the deformation of a honeycomb molding obtained by the 100-th extrusion. The number of molding operations until the molding die became unusable is expressed by a relative value, assuming that the number of molding operations was 1 for the die of Comparative Example 1. The deformation of moldings was evaluated according to the following standard. The results are shown in Table 1.

Good The molding had no bending and deformation.
Fair The molding was usable as a ceramic honeycomb structure despite bending and deformation.
Poor The molding was not usable as a ceramic honeycomb structure because of bending and deformation.

TABLE 1

| No. | Arrangement of Moldable-Material-Supplying Holes | Average of Distances Z (µm) | Number of Molding Operations (Ratio) | Strain in Molded Products |
|---|---|---|---|---|
| Example 1 | Same side | 11 | 1.20 | Good |
| Example 2 | Same side | 20 | 1.25 | Good |
| Example 3 | Both sides | 50 | 1.31 | Good |
| Example 4 | Both sides | 80 | 1.37 | Good |
| Example 5 | Both sides | 98 | 1.48 | Fair |
| Example 6 | Staggering | 95 | 1.40 | Fair |
| Comparative Example 1 | — | 0 | 1 | Good |
| Comparative Example 2 | Same side | 9 | 1.05 | Good |
| Comparative Example 3 | Both sides | 110 | 1.42 | Poor |

As shown in Table 1, the molding dies 11A of Examples 1-6, in which the average of distances Z between the centers 12c of the intersecting portions 33 of the molding grooves 12 and the center axes 13c of the moldable-material-supplying holes 13 was 10-100 µm, had the numbers of molding operations 1.20 times to 1.48 times as much as that of Comparative Example 1, with smaller deformation in moldings.

On the other hand, the molding die 31A of Comparative Example 1, in which the centers 12c of molding grooves 12 were aligned with the center axes 13c of the moldable-material-supplying holes 13, had a smaller number of molding operations than those of the molding dies 11A of Examples 1-6. The molding die 31B of Comparative Example 2, in which the average of distances Z between the centers 12c of molding grooves 12 and the center axes 13c of moldable-material-supplying holes 13 was less than 10 µm, had a smaller number of molding operations than those of the molding dies 11A of Examples 1-6. The molding die 31C of Comparative Example 3, in which the average of distances Z between the centers 12c of the intersecting portions 33 of molding grooves 12 and the center axes 13c of moldable-material-supplying holes 13 was more than 100 µm, had larger deformation in the moldings, because a moldable material extruded from the supply holes did not easily spread uniformly to molding grooves.

EFFECTS OF THE INVENTION

Because the molding die of the present invention can conduct extrusion with reduced stress applied to overlapping portions of the moldable-material-supplying holes and the molding grooves, less cracking occurs in the overlapping portions, and cracking if any does not easily propagate, so that it can be used for a long period of time. Accordingly, narrow grooves suitable for molding ceramic honeycomb structures having thin cell walls can be formed.

What is claimed is:
1. A die comprising molding grooves arranged in a lattice pattern and moldable-material-supplying holes communicat- ing with said molding grooves for molding a ceramic honeycomb structure, said molding grooves having width of 0.05-0.5 mm, said moldable-material-supplying holes being arranged in every intersecting portions of said molding grooves, or in every other intersecting portions of said molding grooves in a checkerboard pattern, center axes of said moldable-material-supplying holes being dislocated from the centers of the intersecting portions of said molding grooves, and an average distance between the centers of the intersecting portions of said molding grooves, at which said moldable-material-supplying holes are arranged, and the center axes of said moldable-material-supplying holes being 10-100 µm.

2. The die for molding a ceramic honeycomb structure according to claim 1, wherein the center axes of said moldable-material-supplying holes are arranged along each molding groove on both sides of its centerline.

3. The die for molding a ceramic honeycomb structure according to claim 1, wherein the center axes of said moldable-material-supplying holes are arranged along each molding groove on the same side of its centerline.

4. The die for molding a ceramic honeycomb structure according to claim 1, wherein the center axes of said moldable-material-supplying holes are arranged along each molding groove staggeringly along its centerline.

* * * * *